Aug. 24, 1948.  E. F. STEINERT  2,447,673
REACTOR WITH MOVABLE CORE MEMBER
Filed Nov. 16, 1944  2 Sheets-Sheet 1
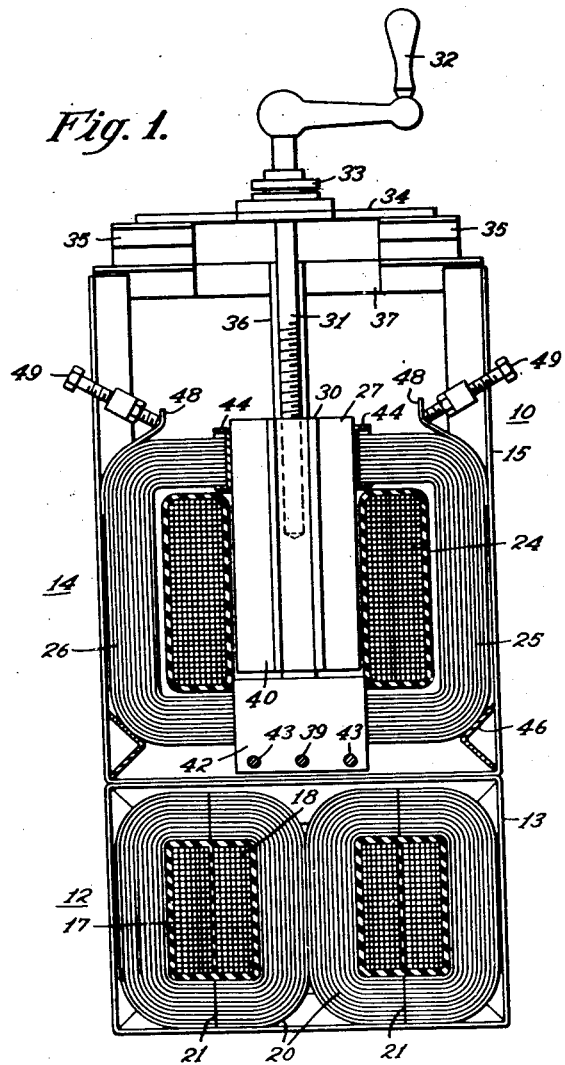
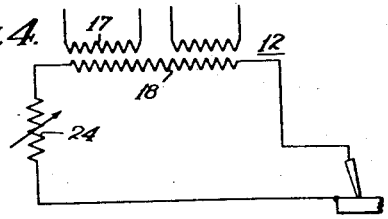
WITNESSES:
Edward Michaels
F. V. Giolma
INVENTOR
Emil F. Steinert.
BY
Crawford
ATTORNEY Aug. 24, 1948.  E. F. STEINERT  2,447,673
REACTOR WITH MOVABLE CORE MEMBER
Filed Nov. 16, 1944  2 Sheets-Sheet 2
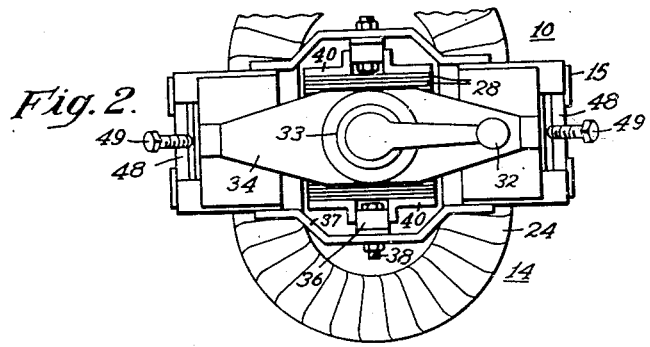
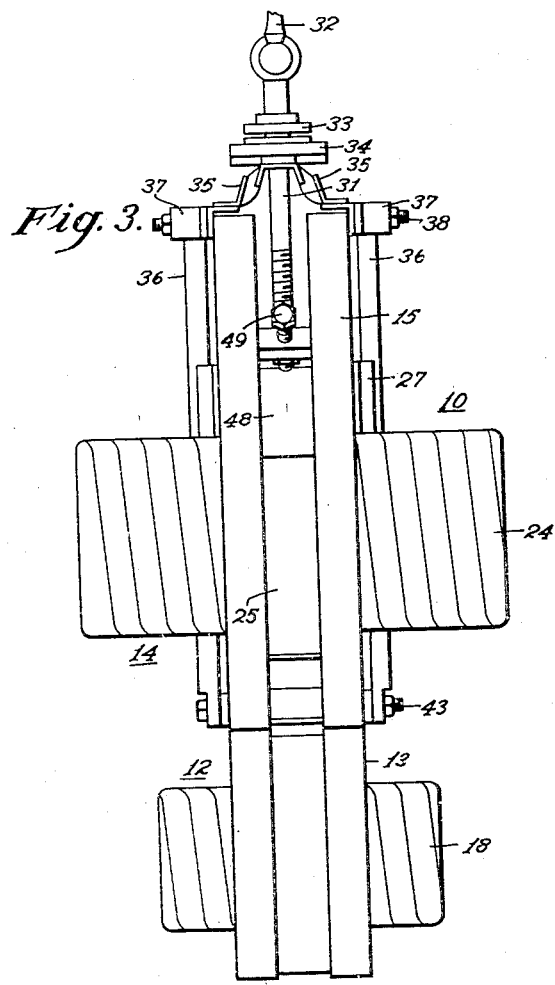
WITNESSES:
Edward Michaels
F. V. Giolma
INVENTOR
Emil F. Steinert.
BY
G. D. Crawford
ATTORNEY Patented Aug. 24, 1948

2,447,673

UNITED STATES PATENT OFFICE 2,447,673

REACTOR WITH MOVABLE CORE MEMBER

Emil F. Steinert, Sharon, Pa., assignor to Westinghouse Electric Corporation, East Pittsburgh, Pa., a corporation of Pennsylvania Application November 16, 1944, Serial No. 563,768

9 Claims. (Cl. 171—242(777))

My invention relates, generally, to current controlling apparatus and it has reference, in particular, to reactors and transformer-reactor power units suitable for use in alternating-current arc welding systems and the like.

Generally stated, it is an object of my invention to provide an improved reactor and a transformer-reactor power unit which are simple and inexpensive to manufacture and are efficient in operation.

More specifically, it is an object of my invention to provide an improved design of transformer-reactor power unit which utilizes wound core units having a plurality of turns of suitable strip magnetic material for both the transformer and reactor.

Another object of my invention is to provide a positive method of obtaining equal air gaps between spaced members of a stationary core and a moving core positioned therebetween in an adjustable reactor or the like.

It is an important object of my invention to provide for using C-shaped strip wound core members in an adjustable reactor with a central movable core member, so as to provide a self-aligning reactor which is simple to assemble and operate.

Yet another object of my invention is to provide for using spacers between spaced sections of a reactor core and a moving core member positioned therebetween, and biasing the sections of the core against the spacers to maintain predetermined uniform air gaps between the sections and the movable core member.

Still another object of my invention is to provide for reducing the size and cost of adjustable reactors by using a high permeability C-shaped spiral wound stationary core member of magnetic strip material arranged in opposed relation with a movable magnetic core member therebetween at one end and fixed inserts at the other, and reducing the losses by making the core and insert of a plurality of laminations edgewise relative to the principal magnetic flux path and having a relatively high resistivity.

It is also an object of my invention to provide a self-aligning adjustable reactor for a transformer reactor power unit having opposed C-shaped core members of an oriented grain low resistivity strip magnetic material separated by an insert of high resistivity magnetic material at one end, and having a movable core member of a high resistivity magnetic material movably supported between the other ends of the core members.

An important object of my invention is to provide for using oriented grain strip material in adjustable air gap reactors at a high value of induction so as to utilize the high permeability characteristics to the best advantage while a movable core and fixed insert are of a lower permeability material having more nearly equal permeabilities in longitudinal and transverse directions.

Other objects will, in part, be obvious and will, in part, be explained hereinafter.

In practicing my invention, the transformer and adjustable reactor of a transformer-reactor power unit comprise the necessary transformer and reactor windings which have the associated stationary magnetic core members thereof composed of high permeability spiral wound strip magnetic material with preferred grain orientation. The stationary core members of the reactors are arranged in opposed relation with a high resistivity movable core and fixed insert of magnetic material positioned between core members at the opposite ends. Insulating spacers are provided between the ends of the reactor stationary core members and the movable core member to maintain predetermined air gaps therebetween, and the ends of the stationary core members between which the movable core member is positioned are biased against the movable core member so as to insure the air gaps being maintained at the value determined by the spacers.

For a more complete understanding of the nature and objects of my invention, reference may be made to the following detailed description which may be studied in connection with the accompanying drawings, in which:

Figure 1 is a front elevational view partly in section of a power unit embodying the invention in one of its forms;

Fig. 2 is a plan view of the power unit shown in Fig. 1;

Fig. 3 is a side elevational view of the power unit; and

Fig. 4 is a schematic diagram showing the connections of the transformer and reaction windings in an arc welding circuit.

Referring to Figs. 1, 2, and 3, the reference numeral 10 may denote, generally, an alternating-current transformer-reactor power unit comprising transformer 12 positioned in a suitable frame structure 13 and a reactor 14 positioned in a frame 15 mounted on the transformer frame. These devices may be used together, as shown, to provide a power unit, or separately.

The transformer 12 may comprise inductively related primary and secondary windings 17 and 18 provided with a core structure of the wound core unit type comprising a plurality of substantially C-shaped core members 20, each comprising a plurality of laminations of suitable strip magnetic material positioned about the transformer windings in a manner well known in the art with butt joints 21 therebetween. The strip material may be of a medium silicon steel having preferred grain orientation with the grain aligned longitudinally of the strip so as to provide a high permeability in one direction and permit operation at a high magnetic induction in the direction of the grain and reduce the amount of steel necessary, hence reducing the size and weight of the transformer by requiring less copper as well as less steel. Such a steel may, for example, contain about 3 to 4 per cent silicon, and have a resistivity on the order of 19 microhms per inch cube.

The reactor 14 may comprise a reactor winding 24 which, as shown in Fig. 4, may be connected in series circuit relation with the secondary winding 18 of the transformer and provided with an adjustable air gap core structure for regulating the welding current. The core structure may comprise substantially C-shaped stationary core members 25 and 26 positioned on opposite sides of the reactor winding 24 so as to partially surround it, and with the inner ends thereof in spaced relation. Since the path of the magnetic flux through these core members is relatively uniform, they may be of a high permeability magnetic strip material. The stationary core members may, in general, be similar to those of the transformer, comprising, for example, sections of a wound core unit having a plurality of laminations of a medium silicon steel strip with preferred grain orientation so as to provide maximum magnetic induction in a direction along the length of the laminations.

In order to vary the impedance of the reactor and change the value of the welding current, a movable core member 27 may be adjustably supported between the upper ends of the core members 25 and 26 for movement within the winding 24. Since the magnetic field through the movable core member is relatively non-uniform, changing from transverse to longitudinal at the upper end, and fringing considerably at the lower end, and of varying strength, depending upon the length of the air gap at the lower end, high permeability oriented grain steel can not be used to the best advantage, as its permeability transversely of the grain is relatively low. In order to provide for operating the core members 25 and 26 at a maximum induction and to compensate for the non-uniform movable core member field and minimize the reactor losses due to eddy currents, the movable core member 27 may comprise a plurality of laminations 28 of a relatively high silicon steel which has more nearly the same permeability in the direction of the laminations as across them, though lower than that of the core members 25 and 26 in the preferred direction, but has a higher resistivity. For example, a steel having approximately 4 to 4½ per cent silicon may be used, having a resistivity on the order of 23 microhms per inch cube. In practice, a 4.4 per cent silicon steel has been used with satisfactory results, and the cross or transverse flux is accommodated as readily as the fringing effects, with a minimum of losses.

The laminations 28 may be stacked so as to be edgewise to the flux from the core members 25 and 26, and positioned about a central portion 30 which may be threaded for receiving the threaded portion of a shaft 31 having a handle 32 and mounted on the frame 15 by means of a bearing 33 on a transverse support 34 which may be connected to the frame adjacent the upper end by means of vibration dampers 35 of the shear type. Elongated guides 36 may be positioned on the opposite sides of the frame by means of brackets 37 and bolts 38 and 39. Means such as the angles 40 may be provided to engage the guides and align the movable core member.

In order that C-shaped stationary core members of a symmetrical design may be used for the stationary reactor core structure, means such as the insert 42 may be positioned between the lower spaced apart ends in abutting relation therewith to complete the magnetic circuit, being for example, secured to the frame 15 by bolts 43. Because of the non-uniform magnetic field at the lower end of the movable core, since the principal flux fringes adjacent the air gap, and changes in direction from nearly vertical to substantially horizontal, the insert may be made of laminations positioned edgewise relative to the movable core member, so that the magnetic flux will not have to travel perpendicular to the surface of the laminations. For the purpose of reducing eddy current losses, the laminations may be of a relatively high silicon steel similar to that of the movable core member, so that the permeability in the vertical direction across the laminations may be substantially equal to that in the horizontal direction or lengthwise of the laminations, as in the case of the movable core member.

In order to provide a reactor that is easily assembled and in which it is easy to maintain a predetermined air gap between each of the core members 25 and 26 and the movable core member 27, and thus eliminate a major portion of the magnetic noises usually produced by adjustable core reactors, it may be desirable to position spacers 44 between the upper ends of the stationary core members and the movable core member 27. The spacers may, for example, comprise caps of an insulating material such as one of the phenol condensation products, which fit over the ends of the core members. If no such gaps in the magnetic circuit are required, the spacers may be omitted.

The core members 25 and 26 may be readily positioned by being seated on inclined supports 46 in the frame 15 which engage the outer curved surfaces of the core members adjacent the lower ends, so as to maintain the lower ends of the stationary core members in close contact with the ends of the insert 42. Suitable means may be provided for resiliently biasing the upper ends of the core members 25 and 26 toward each other so as to maintain the air gaps between them and the movable core member 27 at a value determined by the thickness of the spacers 44. For example, the stationary core members may be operatively connected together by a spring member, or strips 48 of spring material may be secured to the sides of the frame 15 adjacent the upper ends of the stationary core members 25 and 26, and means such as the screws 49 may be adjustably mounted on the frame for biasing the spring strips against the core members 25 and 26 along the outer portions thereof.

From the above description and the accompanying drawing, it will be apparent that I have provided an improved reactor or transformer-reactor power unit which utilizes the benefits of the high induction obtainable in preferred grain orientation magnetic materials to the best advantages. By reason of using such materials, both the transformer and the reactor may be greatly reduced in size and weight. By utilizing high resistivity materials, having more nearly equal permeabilities in the longitudinal and transverse directions, and which are higher than the transverse permeability of the longitudinally oriented grain steel, for the movable core members and insert, the relatively high eddy current losses normally encountered with high induction and non-uniform magnetic fields in such strip wound core structures are obviated. The eddy current losses are also reduced because the flux lines in the laminated C-core members are substantially prevented from having to travel transversely between the laminations in either the high or the low resistivity steels. Instead, they travel longitudinally and transversely in the plane of laminations having more nearly equal induction longitudinally and transversely, and having high resistivity, so that the eddy current losses are less.

Since certain changes may be made in the above-described construction, and different embodiments of the invention may be made without-departing from the spirit and scope of the invention, it is intended that all the matter contained in the above description or shown in the accompanying drawings shall be considered as illustrative and not in a limiting sense.

I claim as my invention:

1. A reactor comprising, a reactor winding, a pair of substantially C-shaped magnetic core members positioned in opposed spaced relation on opposite sides of the reactor winding, an elongated core of magnetic material positioned between adjacent portions of the core members at one end and movable longitudinally into the reactor winding, and a fixed insert of magnetic material between adjacent portions of the core members at the other end.

2. For use in a transformer-reactor power unit, a reactor comprising, a winding, a pair of substantially C-shaped silicon steel core members having preferred grain orientation positioned in opposed spaced relation on opposite sides of the reactor winding, an elongated core member positioned between the ends of the core members at one end of the reactor and movable longitudinally in and out of the reactor winding, a stationary insert positioned between the core members at the other end, and means biasing the core members against the movable core member and insert.

3. For use with an arc welding transformer, a reactor comprising, a winding, a pair of substantially C-shaped flat wound core members of oriented silicon steel positioned on opposite sides of the winding in spaced and opposed relation, an elongated magnetic core member positioned between the core members at the one end and movable longitudinally in and out of the winding, and a stationary laminated insert of a different magnetic material positioned between the core members at the other end having the laminations edgewise to the movable magnetic shunt.

4. A reactor comprising, a reactor winding, a pair of flat wound laminated C-shaped core members of high silicon steel having the grain oriented lengthwise of the laminations and positioned in spaced and opposed relation on opposite sides of the winding, a longitudinally movable core positioned between the core members at one end of relatively high resistivity laminations edgewise to the core members, and an insert of high resistivity laminations positioned in fixed relation between the core members at the other end edgewise relative to the movable core member and the core members.

5. In an adjustable air gap reactor, a reactor winding, a pair of substantially C-shaped core members of magnetic material positioned on opposite sides of the winding in spaced relation with the open sides thereof facing each other, an elongated core member comprising a plurality of laminations positioned edgewise in the gap between the core members at one end and movable longitudinally in the gap, an insert comprising a plurality of laminations of magnetic material edgewise to the movable core members positioned between the core members, and means biasing the core members toward each other.

6. A reactor comprising, a reactor winding, a pair of substantially C-shaped core members positioned in spaced relation and partially surrounding the winding, an insert positioned between the members at one end, an elongated movable core movably positioned between the legs adjacent the other end, a spacer positioned between each of the legs and the movable core, and means biasing the core members toward the insert and movable core members.

7. An adjustable reactor comprising, a pair of C-shaped core members of flat wound oriented grain medium silicon steel laminations positioned in spaced relation with the open sides adjacent, an insert of laminated magnetic material positioned between the members at one end with the laminations in substantially the plane of the members, a reactor winding positioned between the members having an opening with the axis thereof in the plane of the members and extending between the ends, an elongated magnetic core member movable longitudinally within the winding and in the space between the members at the other end, a spacer of non-magnetic material positioned between the movable core member and each of the adjacent ends of the core members, and means biasing said ends of the core members toward the movable core member to maintain predetermined air gaps therebetween.

8. An adjustable reactor comprising, a reactor winding, a pair of substantially C-shaped core members comprising a plurality of high induction high silicon steel laminations with preferred grain orientation formed flatwise, said core members being positioned in spaced and opposed relation on opposite sides of the winding, an insert of high resistivity laminations positioned in abutting relation between the core members at one end, an elongated movable core member of magnetic material positioned between the core members at the other end and movable longitudinally relative to the insert, a non-magnetic spacer positioned between the movable core member and each of the other ends of the C-shaped core members, a frame positioned about the C-shaped core members, and means intermediate the C-shaped core members and the frame biasing the core members toward each other.

9. An adjustable reactor comprising, a reactor winding, a pair of substantially C-shaped core members comprising sections of a flat wound core of silicon steel strips with preferred grain orientation, said core members being positioned on opposite sides of the reactor winding with the adjacent normally adjoining surfaces in spaced relation, an insert of high silicon steel laminations of relatively high resistivity positioned between the core members at one end, an elongated core member of relatively high resistivity laminations of magnetic material positioned between the core members at said other end and movable longitudinally relative to the insert, a cap of insulating material positioned over the end of each core member at said other end, a frame positioned about the core members, and means mounted on the frame operable to bias the core members toward the insert and movable core member.

EMIL F. STEINERT.

REFERENCES CITED

The following references are of record in the file of this patent:

UNITED STATES PATENTS

| Number | Name | Date |
|---|---|---|
| Re. 22,609 | Steinert | Feb. 27, 1945 |
| 1,539,840 | Hengstenberg | June 2, 1925 |
| 2,230,945 | Hansell | Feb. 4, 1941 |
| 2,284,323 | Kingergy | May 26, 1942 |